(12) United States Patent
Hsu

(10) Patent No.: US 7,724,305 B2
(45) Date of Patent: May 25, 2010

(54) VIDEO DATA CONVERSION METHOD AND SYSTEM FOR MULTIPLE RECEIVERS

(75) Inventor: Chih-Wei Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1100 days.

(21) Appl. No.: 11/385,497

(22) Filed: Mar. 21, 2006

(65) Prior Publication Data

US 2007/0222891 A1    Sep. 27, 2007

(51) Int. Cl.
*H04N 11/20* (2006.01)
*H04N 7/01* (2006.01)

(52) U.S. Cl. .................. 348/453; 348/450

(58) Field of Classification Search .......... 348/453, 348/450, 441, 458, 581, 582, 624; 382/233, 382/250, 261, 299, 300; 345/603–605
See application file for complete search history.

(56) References Cited

U.S. PATENT DOCUMENTS

| | | | | |
|---|---|---|---|---|
| 5,650,824 A | | 7/1997 | Huang | 348/453 |
| 5,982,459 A | * | 11/1999 | Fandrianto et al. | 348/425.3 |
| 6,064,450 A | * | 5/2000 | Canfield et al. | 375/240.29 |
| 6,188,730 B1 | * | 2/2001 | Ngai et al. | 375/240.21 |
| 6,348,950 B1 | * | 2/2002 | Kishida | 348/458 |
| 6,411,333 B1 | * | 6/2002 | Auld et al. | 348/441 |
| 6,437,827 B1 | * | 8/2002 | Baudouin | 348/453 |
| 6,674,479 B2 | | 1/2004 | Cook et al. | 348/453 |
| 7,006,147 B2 | * | 2/2006 | Willis | 348/448 |
| 2001/0043282 A1 | * | 11/2001 | Hu | 348/453 |
| 2004/0218094 A1 | * | 11/2004 | Choi | 348/441 |
| 2004/0223058 A1 | * | 11/2004 | Richter et al. | 348/207.1 |
| 2005/0206784 A1 | * | 9/2005 | Li et al. | 348/441 |
| 2005/0285813 A1 | * | 12/2005 | Obinata | 345/3.2 |

* cited by examiner

*Primary Examiner*—Victor Kostak
(74) *Attorney, Agent, or Firm*—Thomas, Kayden, Horstemeyer & Risley (57) ABSTRACT

Methods for video data conversion, performed by a converter, are provided. An embodiment of the video data conversion method comprises the following steps. Chroma data of a target line is acquired from a first portion of a video stream in a transmission format. Chroma data of a certain number of neighboring lines near the target line is acquired from a second portion of the video stream. New chroma data is calculated from the acquired chroma data of the target line and the neighboring lines. The acquired chroma data of the target line is replaced with the new chroma data of the target line encapsulated into the first portion of the video stream. The modified video stream is transmitted to multiple receiving devices thereby the multiple receiving devices may obtain the video stream in a format used for subsequent process without additional computation.

20 Claims, 11 Drawing Sheets

VIDEO DATA CONVERSION METHOD AND SYSTEM FOR MULTIPLE RECEIVERS

BACKGROUND

The invention relates to video data processing, and more particularly, to systems and methods for video data conversion.

The chrominance (chroma) formats for the digital video supported by the MPEG-2 (Moving Picture Experts Group) international standard include 4:4:4, 4:2:2, and 4:2:0 formats. CCIR 656 is a common data format used in data transmission among different devices, which carries the data in 4:2:2 format. A conventional receiving device such as a display device, video encoding device or similar, adopting 4:2:0 format, is typically equipped with a converter to convert received video data encoded in 4:2:2 format into video data encoded in 4:2:0 format. In each converter, one of various chrominance downsampling algorithms is employed, for example, at least one line buffer is required to average the chrominance data of at least two neighboring lines within a frame (picture). As more receiving devices are used, more converters are required, resulting in increased hardware costs.

SUMMARY

Methods for video data conversion, performed by a converter, are provided. An embodiment of a method comprises the following steps. Chroma data of a target line is acquired from a first portion of a video stream in a transmission format. Chroma data of a certain number of neighboring lines near the target line is acquired from a second portion of the video stream. New chroma data is calculated from the acquired chroma data of the target line and the neighboring lines. The acquired chroma data of the target line is replaced with the new chroma data of the target line. The new chroma data of the target line is encapsulated into the first portion of the video stream. The modified video stream is transmitted to multiple receiving devices.

Systems for video data conversion are also provided. An embodiment of a system comprises multiple receiving devices and a single converter. The converter coupling to the receiving devices acquires chroma data of a target line, acquires chroma data of a certain number of neighboring lines near the target line, calculates new chroma data from the acquired chroma data of the target line and the neighboring lines, replaces the acquired chroma data of the target line with the new chroma data of the target line and transmits the new chroma data of the target line to the receiving devices.

BRIEF DESCRIPTION OF THE DRAWINGS

The present invention can be more fully understood by reading the subsequent detailed description and examples with references made to the accompanying drawings, wherein.

DETAILED DESCRIPTION

YCbCr is one of two primary color spaces used to represent digital component video (the other is RGB). The difference between YCbCr and RGB is that YCbCr represents color as brightness and two color difference signals, while RGB represents color as red, green and blue. In YCbCr, the Y is the brightness (luma), Cb is blue minus luma (B−Y) and Cr is red minus luma (R−Y). In order to efficiently use the storage space and bandwidth, Cb and Cr are sampled at a lower rate than Y, which is technically known as "chroma subsampling" or "chroma down-sampling." Human eyes are less sensitive to the variation in chrominance component comparing to the variation in luminance component while viewing color images. Therefore, some color information in the video signal is being discarded to further compress the file, but not brightness (luma) information.

Figure 1A:
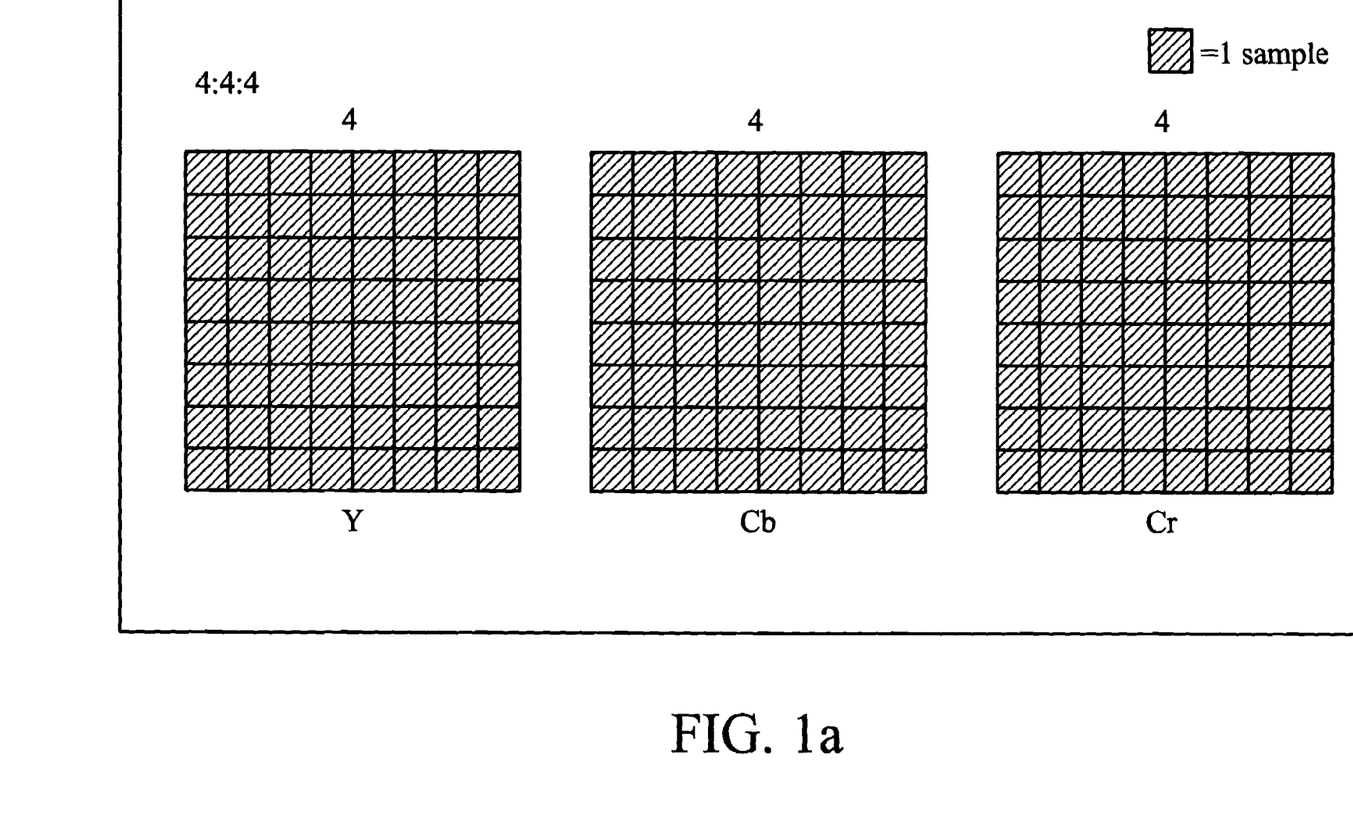
FIG. 1a is a diagram showing an exemplary 4:4:4 format.
Figure 1B:
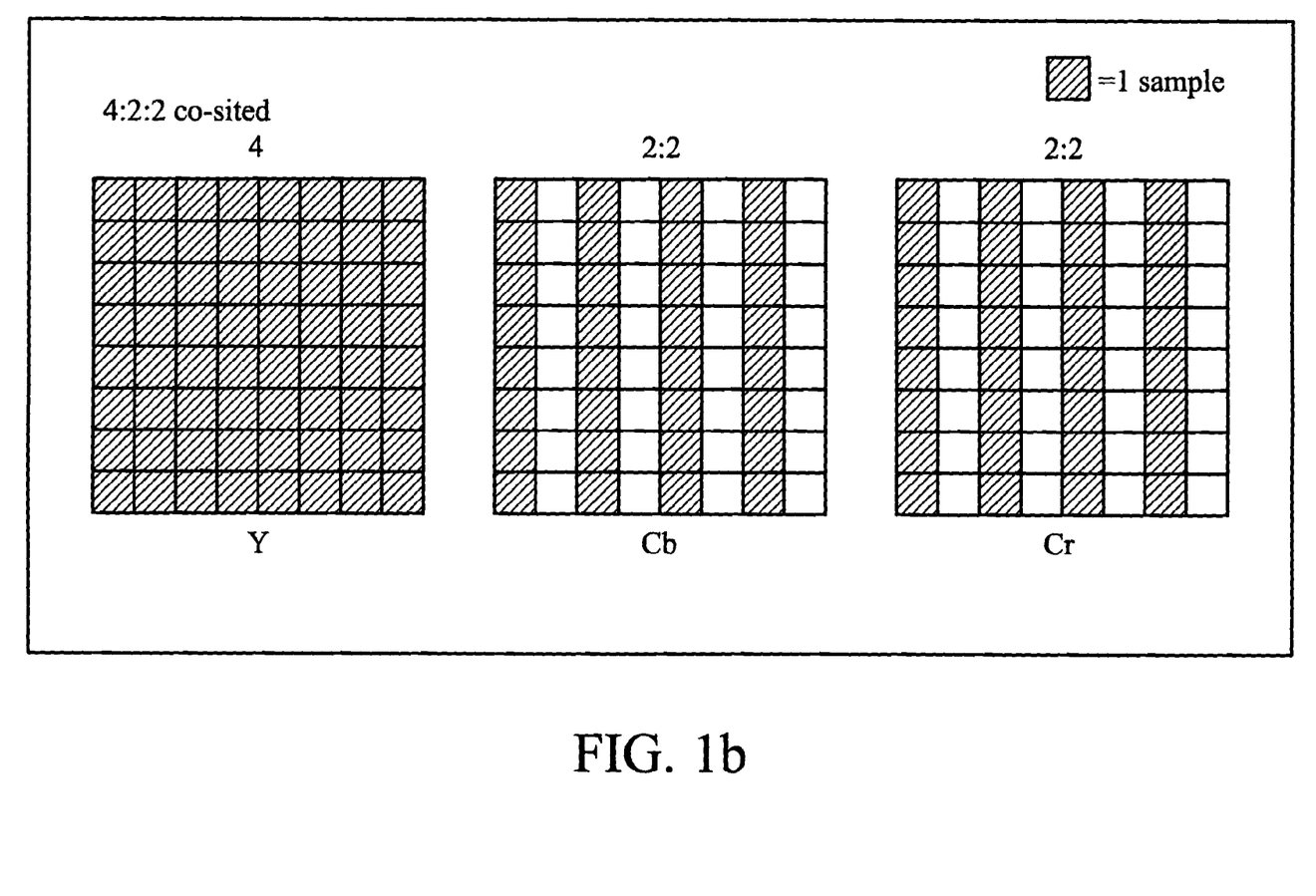
FIG. 1b is a diagram showing an exemplary 4:2:2 co-sited format.
Figure 1C:
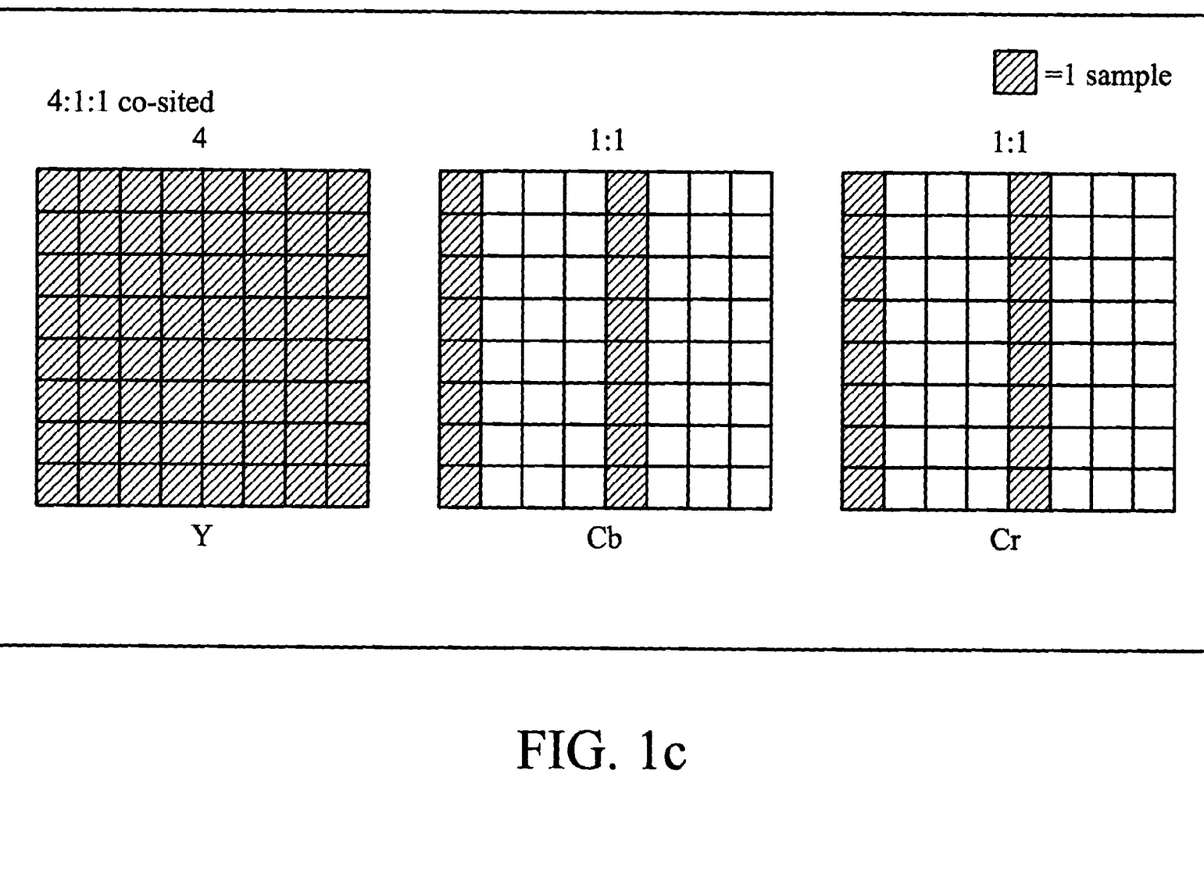
FIG. 1c is a diagram showing an exemplary 4:1:1 co-sited format.
Figure 1D:
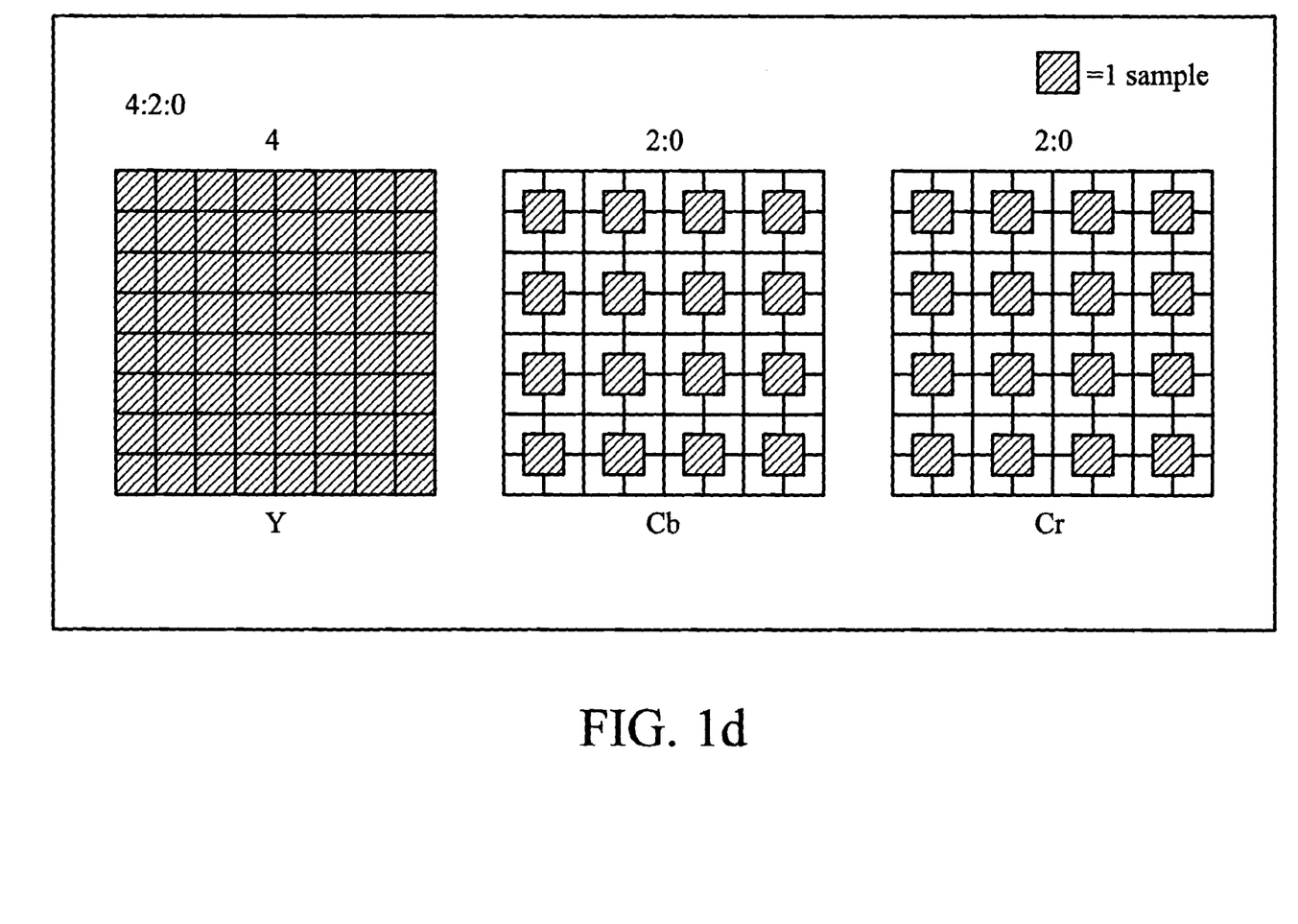
FIGS. 1d and 1e are diagrams showing an exemplary 4:2:0 format.
Figure 1E:
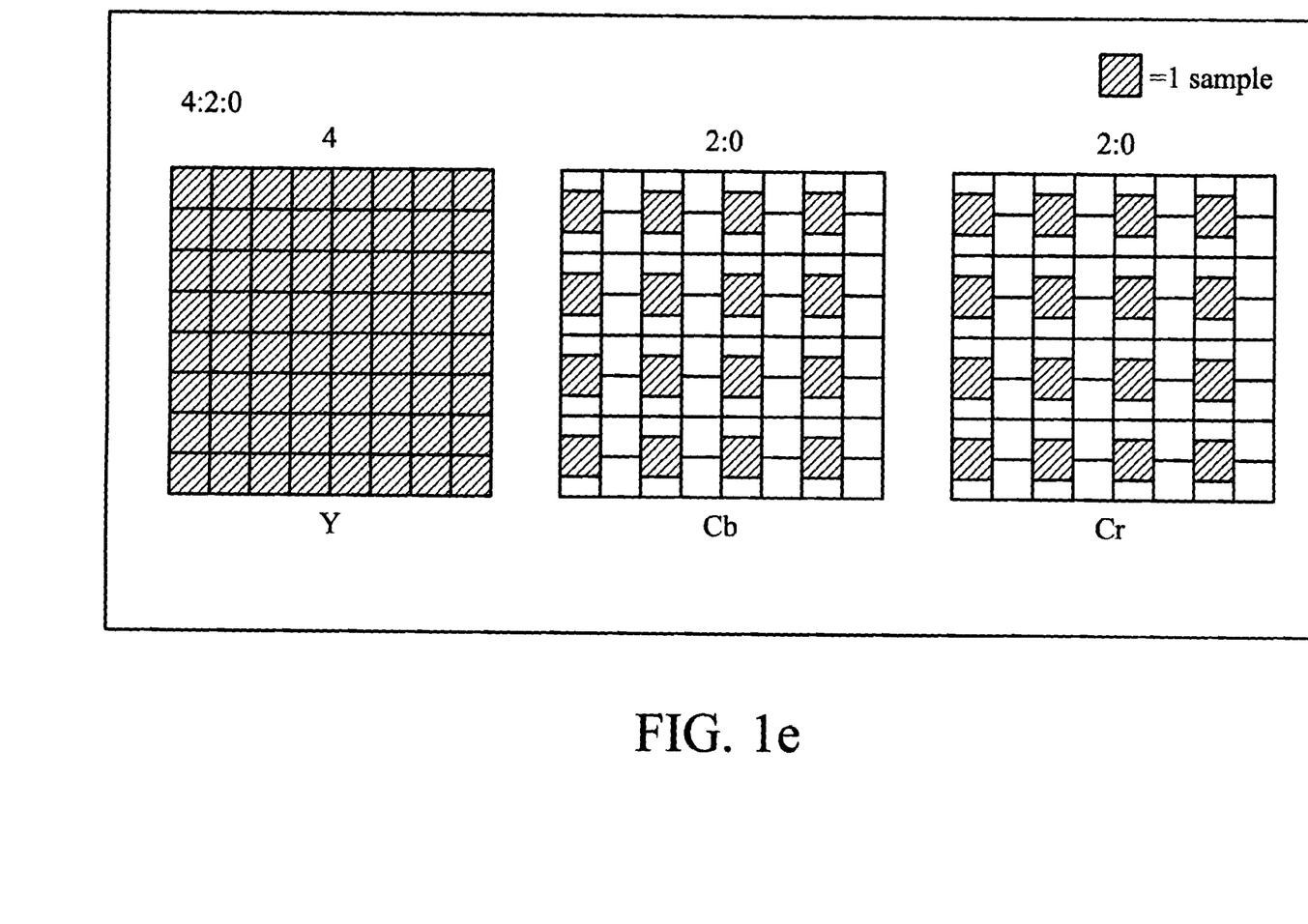

YCbCr is designated as "4:m:n". The "4" typically represents a sampling rate of 13.5 MHz for Y, which is the standard frequency set forth by ITU-R BT.601 for digitizing analog NTSC, PAL and SECAM signals. The next two digits represent the Cb and Cr rates. Various video formats are further described with references made to the accompanying drawings. FIG. 1a is a diagram of exemplary 4:4:4 format, where Cb and Cr are sampled at the same full rate as Y. FIG. 1b is a diagram of exemplary 4:2:2 co-sited format, where Cb and Cr are sampled at half the horizontal resolution of Y. Co-sited means that Cb/Cr samples are taken at the same time as Y. FIG. 1c is a diagram of an exemplary 4:1:1 co-sited format, where Cb and Cr are sampled at one quarter the horizontal resolution of Y. FIGS. 1d and 1e are diagrams of exemplary 4:2:0 formats, where the zero in 4:2:0 means that Cb and Cr may be sampled at half the vertical resolution of Y.

Figure 2:
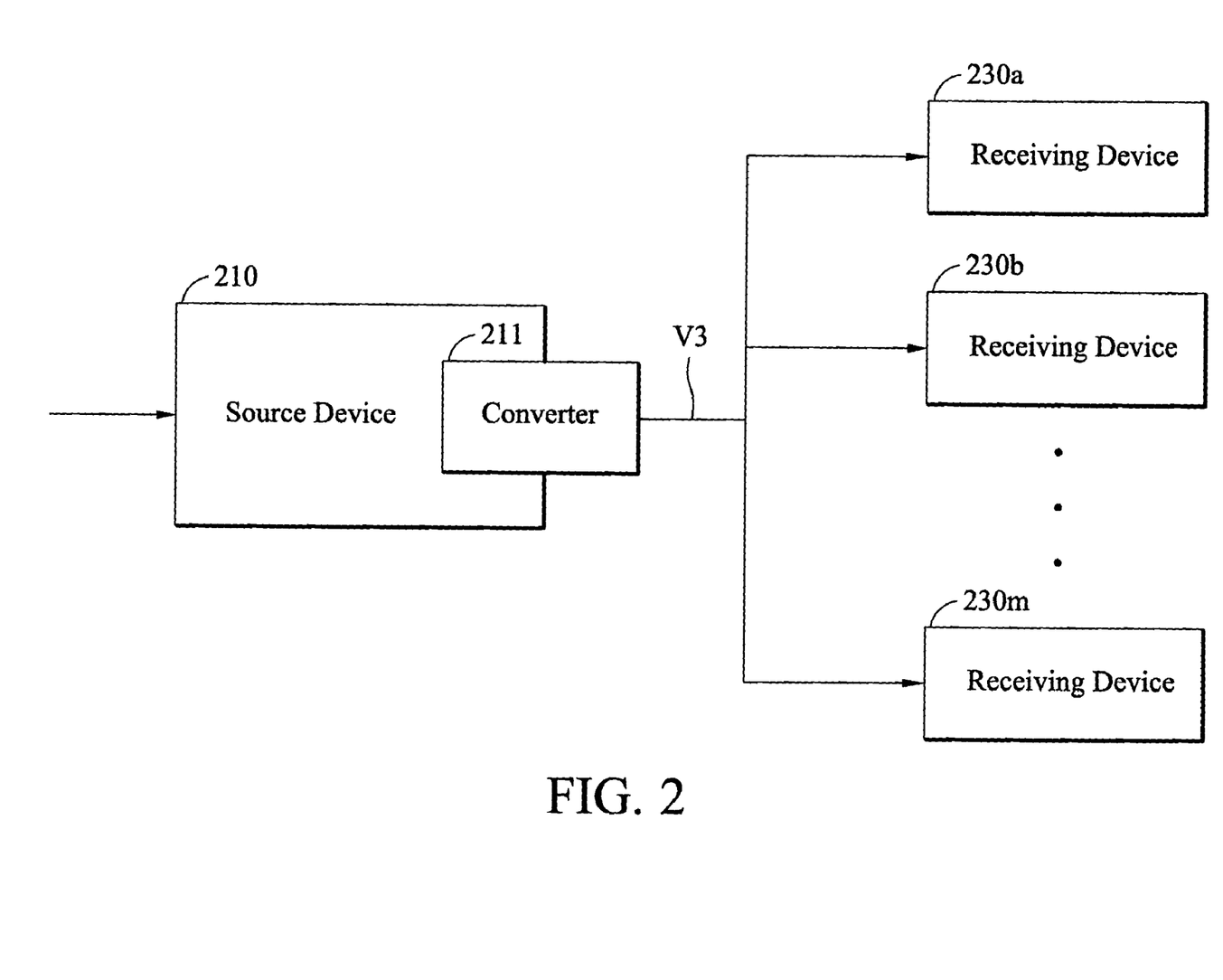
FIGS. 2 and 3 are diagrams illustrating embodiments of a system for video data conversion.

FIG. 2 is a diagram of an embodiment of a system for video data conversion, comprising a source device 210 with a built-in converter 211, and multiple receiving devices 230a to 230m, where m represents a total number of receiving devices. The converter 211 continuously acquires chroma data of a target line from multiple lines of a frame, and chroma data of a certain number of neighboring lines near the target line to calculate new chroma data from the acquired chroma data of the target line and the neighboring lines. The acquiring chroma data of the target line is replaced with the new chroma data of the target line and the new chroma data of the target line is transmitted to the receiving devices. In this embodiment, each of the receiving devices simply drops half of the chroma data received from the built-in converter 211 to generate a video stream encoded in the 4:2:0 format). The source device 210 may be a TV decoder or similar, for receiving and digitalizing analog NTSC, PAL and SECAM signals. One of the receiving devices 230a~230m may be a display device, a digital video recording device or similar.

Figure 3:
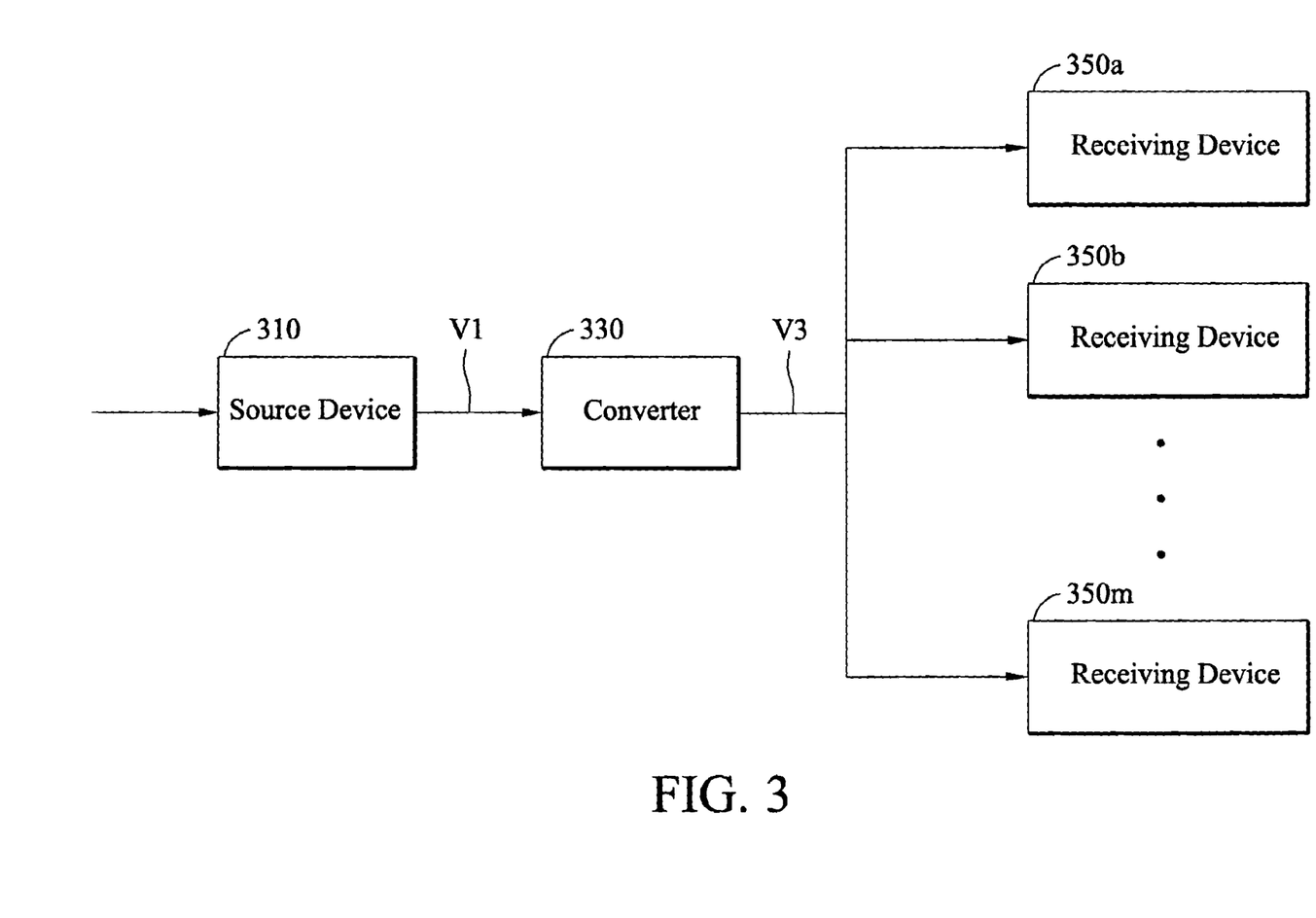

FIG. 3 is a diagram of an embodiment of a system for video data conversion, comprising a source device 310, a converter 330 and multiple receiving devices 230a to 230m, where m represents a total number of receiving devices. The converter 330, an isolated device, continuously acquires chroma data of a target line from multiple lines of a frame, and chroma data of a certain number of neighboring lines near the target line from the source device 210, calculates new chroma data from the acquired chroma data of the target line and the neighboring lines, replaces the acquiring chroma data of the target line with the new chroma data of the target line, and transmits the new chroma data of the target line to the receiving devices. Each of the receiving devices does not require further calculation, it simply drops half of the chroma data received from the converter 330 to generate a video stream encoded in the 4:2:0 format for subsequent processes. Similar to the devices shown in FIG. 2, the source device 310 may be a TV decoder, for receiving and digitalizing analog NTSC, PAL and SECAM signals to generate a digital video stream V1 encoded in the CCIR 656 format. The receiving devices 350a~350m may be a display device, a digital video recording device or similar.

Figure 4:
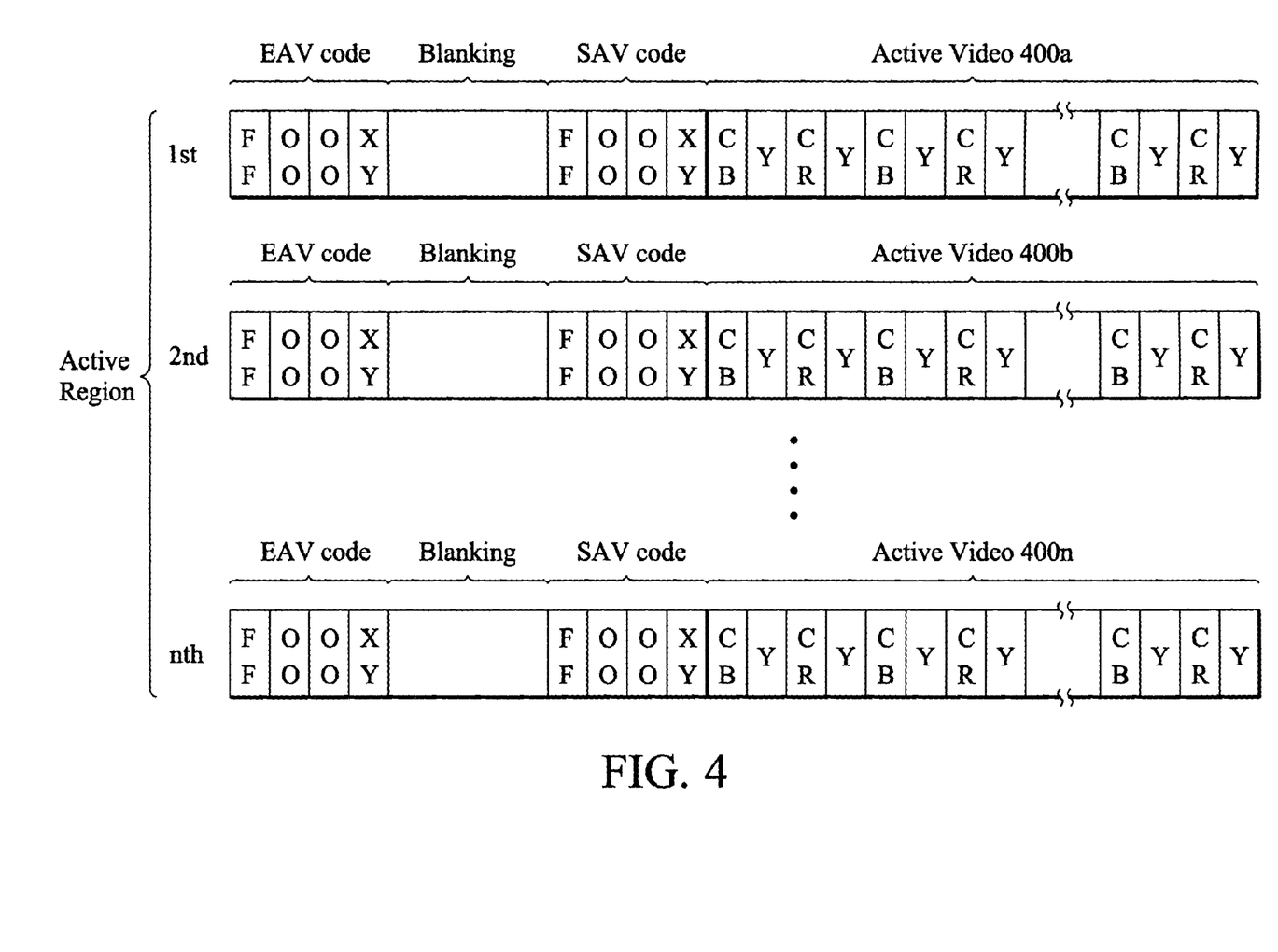
FIG. 4 is a diagram illustrating an exemplary video stream of a frame encoded in the CCIR 656 format.

FIG. 4 is a diagram of an exemplary video stream of a frame encoded in the CCIR 656 format, comprising frame data of n lines, where n represents a total number of lines in a frame. Each line is divided into four portions, end of active video (EAV) code, blanking, start of active video (SAV) code and active video. The active video portion such as one of 400a to 400n stores pixel data of one line. Pixel data in the active video portion is encoded in the 4:2:2 format, that is, two units of luma data (denoted as Y) accompanying with one pair of chroma data (denoted as CB and CR). Each unit may be a block of 4×4, 8×4, 8×8, 16×8, or 16×16 pixels.

Figure 5:
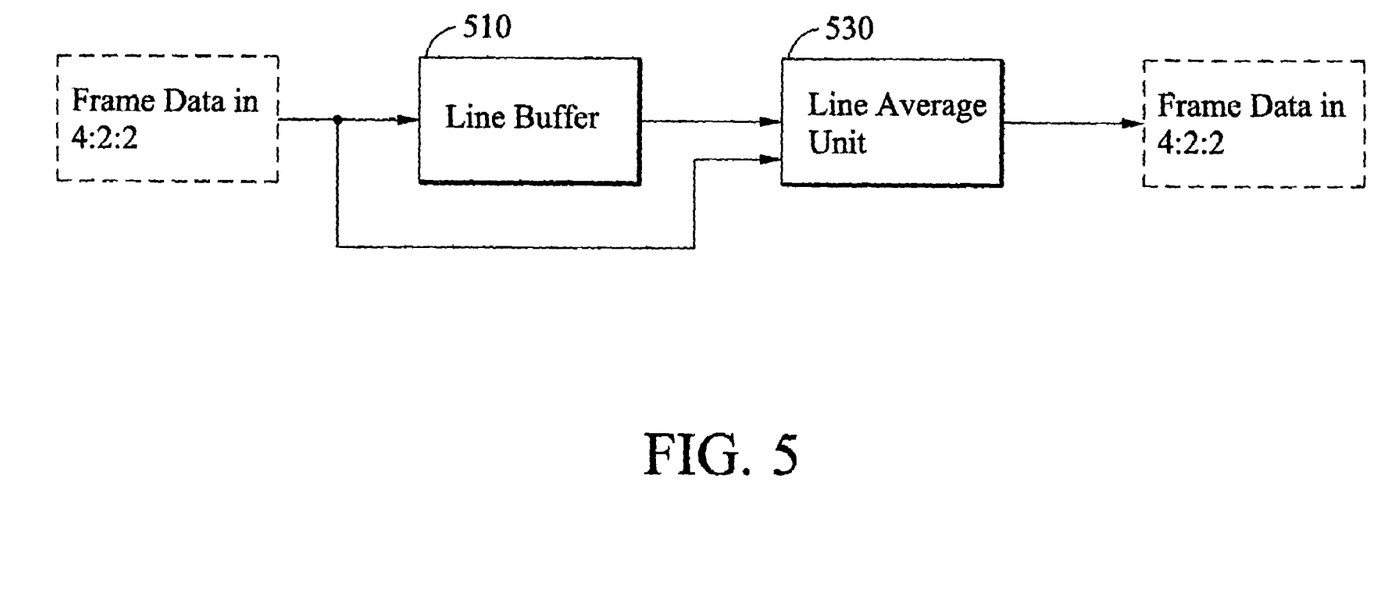
FIG. 5 is a diagram illustrating an embodiment of a converter.

FIG. 5 is a diagram of an embodiment of a converter, comprising a line buffer 510 and a line average unit 530. The converter receives a video stream encoded in the 4:4:2 format from a source device, generates a modified video stream encoded in the 4:4:2 format by updating chroma data of the video stream, and transmits the modified video stream to multiple receiving devices such as 230a to 230n (FIG. 2) or 350a to 350n (FIG. 3). The line buffer 510 may be implemented in a memory device such as a dynamic random access memory (DRAM), synchronous DRAM (SDRAM), flash memory or similar to cache frame data of a certain number of lines while processing the cached frame data and generating the modified video stream. The line average unit 530 employs an averaging operation such as a bilinear operation, an FIR-like operation or similar, and/or a linear-transformation operation to generate new chroma data.

Figure 6:
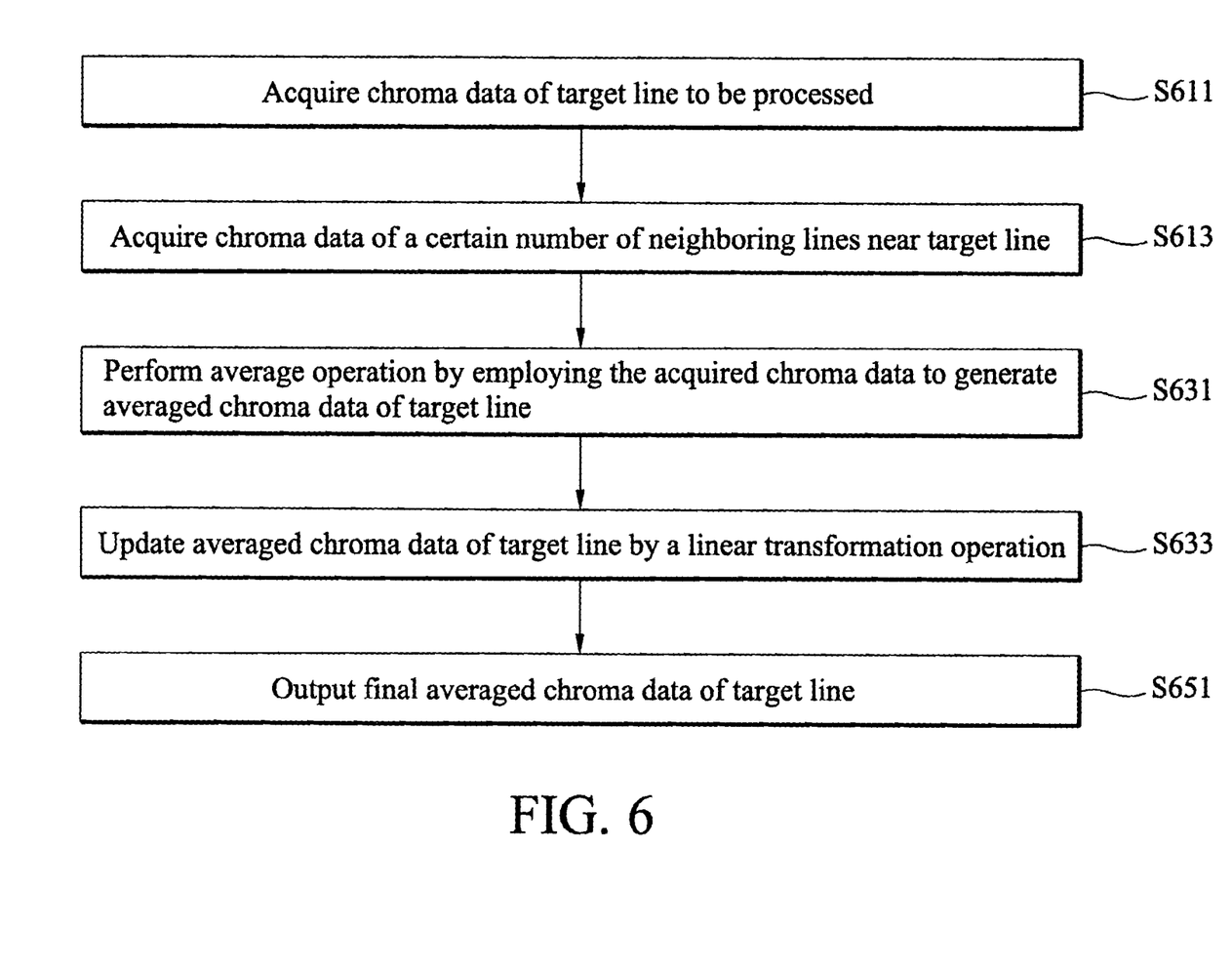
FIG. 6 is a flowchart of showing embodiment of a conversion operation for chroma data of one line.

FIG. 6 is a flowchart of an embodiment of a conversion operation for one line of chroma data, employed by the line average unit 530 (FIG. 5). In step S611, chroma data of a target line to be processed is acquired. The chroma data of a target line may be extracted from a particular portion of a video stream in a specific transmission format, and the chroma data may be acquired from a source device or a line buffer. For example, the chroma data of the target line may be extracted from an active video portion (e.g. one of 400a to 400n of FIG. 4) of a video stream in CCIR 656 format. In step S613, chroma data of a certain number of neighboring lines near the target line is acquired. The chroma data of the neighboring lines may also be extracted from a particular portion of a video stream in a specific transmission format, and the chroma data of the neighboring lines may be acquired from a line buffer. In step S631, an average operation is performed by calculating the acquired chroma data to generate average chroma data of the target line. A line buffer capable of caching chroma data of neighboring lines, or caching chroma data of both target and neighboring lines according to the requirement of the average operation is used to accomplished step S631.

The average chroma data may be calculated by two exemplary formulae of a bilinear operation:

$$\overline{CB} = (CB_i - CB_{i-1}) \times \alpha + CB_{i-1}; \text{ and}$$

$$\overline{CR} = (CR_i - CR_{i-1}) \times \alpha + CR_{i-1},$$

where $\overline{CB}$ and $\overline{CR}$ represent average chroma data, i represents a serial number of a target line, $CB_i$ and $CR_i$ represent the acquired chroma data of the target line, $CB_{i-1}$ and $CR_{i-1}$ represent the acquired chroma data of the (i−1)th line (i.e. a line preceding the target line) and α represents a weight value ranging from zero to one. For example, while α=0.5, the bilinear operation considers that chroma data in the target line and the preceding line is equally weighted. While α>0.5, the bilinear operation provides a greater weight to chroma data in the current line than chroma data in the preceding line. While α<0.5, the bilinear operation provides a greater weight to chroma data in the preceding line than chroma data in the target line.

Alternatively, the average chroma data may be calculated by two exemplary formulae of an FIR-like operation:

$$\overline{CB} = \sum_{k=i-K}^{i+J} CB_k \times \alpha_k; \text{ and}$$

$$\overline{CR} = \sum_{k=i-K}^{i+J} CR_k \times \alpha_k,$$

where $\overline{CB}$ and $\overline{CR}$ represent average chroma data, i represents a serial number of a target line, K and J are constants respectively represent a lower limit and an upper limit for neighboring line acquisition, and $CB_k$ and $CR_k$ represent the acquired chroma data in the kth line and $\alpha_k$ represents a weight value ranging from zero to one for the kth line. Note that the summation of $\alpha_k$ preferably equals one. For example, while K and J are both equal to 1 and $\alpha_i$=0.5, $\alpha_{i-1}$=0.25 and $\alpha_{i+1}$=0.25, the FIR-like operation references chroma data of two neighboring lines to average chroma data of the target line and provides a greater weight to chroma data in the current line than chroma data in the neighboring lines.

In step S633, the average chroma data of the target line is updated by a linear transformation operation. The average chroma data may be updated by two exemplary formulae of a linear transformation operation shown in the following:

$$\overline{CBr} = a \times \overline{CB} + b; \text{ and}$$

$$\overline{CRr} = a \times \overline{CR} + b,$$

where $\overline{CBr}$ and $\overline{CRr}$ represent updated chroma data, $\overline{CB}$ and $\overline{CR}$ represent average chroma data, a represents a changing rate (the change in $\overline{CB}$ or $\overline{CR}$ per one unit change in $\overline{CBr}$ or $\overline{CRr}$) and b represents an offset (the value of $\overline{CBr}$ or $\overline{CRr}$ when $\overline{CB}$ or $\overline{CR}$ is zero). Note that step S633 may be omitted to reduce process time or hardware cost.

Figure 7:
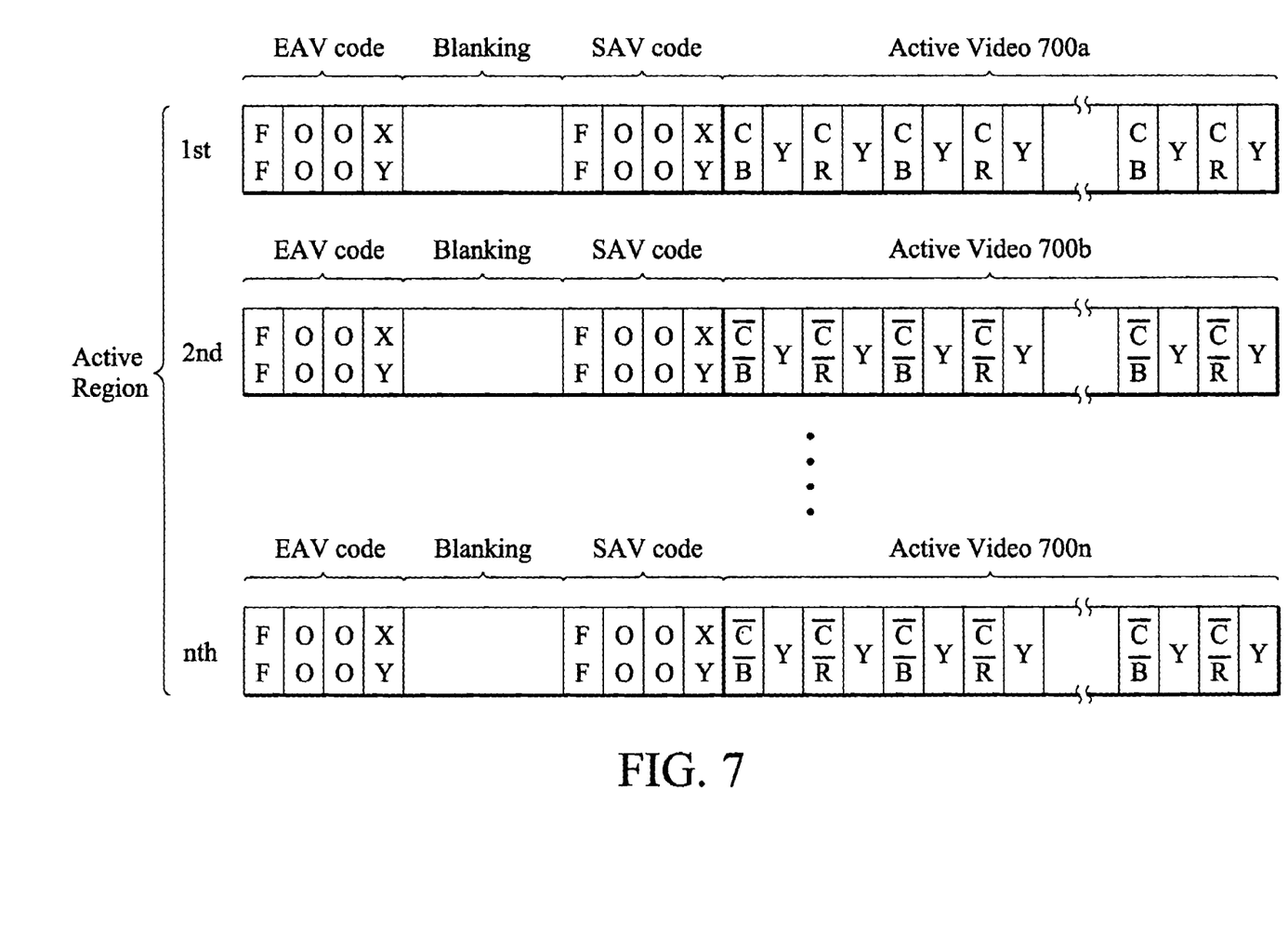
FIG. 7 is a diagram illustrating an exemplary video stream of a frame encoded in the CCIR 656 format.

In step S651, final chroma data of the target line, which is the averaged chroma data generated by step S631 or the updated chroma data generated by step S633, is output to the receiving devices. In order to achieve the compatibility with a transmission specification, the final chroma data of the target line may be encapsulated into a particular portion of a video stream in a specific transmission format. For example, the final average chroma data is encapsulated into an active video portion of a video stream in the CCIR 656 format. Note that a receiving device simply drops alternative lines of chroma data to form a video stream in 4:2:0 format for subsequent display, encoding or recording. The receiving device obtains the video stream in 4:2:0 format without executing additional conversion operation. FIG. 7 is a diagram of an exemplary video stream of a frame encoded in the CCIR 656 format, comprising n lines of frame data, where n represents a total number of lines in a frame. Each line is also divided into four portions, EAV code, blanking, SAV code and active video. The active video portion 700a of the first line stores the original pixel data. The original pixel data in the active video portion 700a is encoded in the 4:2:2 format, that is, two units of luma data (denoted as Y) accompanying with one pair of chroma data (denoted as CB and CR). The active video portion of the following lines, such as one of 700b to 700n, stores the newly modified pixel data. The newly modified pixel data in the active video portion is also in the 4:2:2 format with the modified chroma data, where the chroma data is modified to allow the receiving end to simply drop half of the chroma data to obtain 4:2:0 video stream, while reserving reasonable visual quality. Those skilled in the art may make relevant alterations and modifications to realize the 4:2:2-to-4:2:0 converter, and a shared 4:1:1-to-4:1:0 converter or similar shared converters for video data format conversion can also be derived based on the concept proposed in the present invention.

Certain terms are used throughout the description and claims to refer to particular system components. As one skilled in the art will appreciate, consumer electronic equipment manufacturers may refer to a component by different names. This document does not intend to distinguish between components that differ in name but not function. The term "couple" used in the specification and the claims is intended to mean either an indirect or direct electrical connection. For example, if a first device couples to a second device, that connection may be through a direct electrical connection, or through an indirect electrical connection via other devices and connections.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for video data conversion, performed by a converter, comprising:
    acquiring chroma data of a target line from a first portion of a video stream encoded in a first transmission format;
    acquiring chroma data of a certain number of neighboring lines near the target line from a second portion of the video stream;
    generating new chroma data by signal processing the acquired chroma data of the target line and the neighboring lines;
    replacing the acquired chroma data of the target line with the new chroma data of the target line;
    encapsulating the new chroma data of the target line into the first portion of the video stream; and
    transmitting the video stream with the new chroma data encoded in the first transmission format to a plurality of receivers,
    enabling each of the receivers to receive the transmitted video stream and to drop partial chroma data from the received video stream to obtain a new video stream encoded in a second transmission format.

2. The method as claimed in claim 1 wherein the first portion and second portion are active portions of the video stream, and the first transmission format is CCIR 656.

3. The method as claimed in claim 2 wherein the first transmission format is 4:2:2 format and the second transmission format is 4:2:0 format.

4. The method as claimed in claim 1 wherein the new chroma data of the target line are derived by two formulae:

$$\overline{CB} = (CB_i - CB_{i-1}) \times \alpha + CB_{i-1}; \text{ and}$$

$$\overline{CR} = (CR_i - CR_{i-1}) \times \alpha + CR_{i-1},$$

where $\overline{CB}$ and $\overline{CR}$ represent the new chroma data of the target line, i represents a serial number of the target line, $CB_i$ and $CR_i$ represent the acquired chroma data of the target line, $CB_{i-1}$ and $CR_{i-1}$ represent the acquired chroma data of the neighboring line and $\alpha$ represents a weight value ranging from zero to one.

5. The method as claimed in claim 1 wherein the new chroma data are derived by following formulae:

$$\overline{CB} = (CB_i - CB_{i-1}) \times \alpha + CB_{i-1};$$

$$\overline{CR} = (CR_i - CR_{i-1}) \times \alpha + CR_{i-1};$$

$$\overline{CBr} = a \times \overline{CB} + b; \text{ and}$$

$$\overline{CRr} = a \times \overline{CR} + b,$$

where $\overline{CB}$ and $\overline{CR}$ represent average chroma data, i represents a serial number of the target line, $CB_i$ and $CR_i$ represent the acquired chroma data of the target line, $CB_{i-1}$ and $CR_{i-1}$ represent the acquired chroma data of the neighboring line and $\alpha$ represents a weight value ranging from zero to one, $\overline{CBr}$ and $\overline{CRr}$ represent the new chroma data, a represents a changing rate and b represents an offset.

6. The method as claimed in claim 1 wherein the new chroma data of the target line are derived by two formulae:

$$\overline{CB} = \sum_{k=i-K}^{i+J} CB_k \times \alpha_k; \text{ and}$$

$$\overline{CR} = \sum_{k=i-K}^{i+J} CR_k \times \alpha_k,$$

where $\overline{CB}$ and $\overline{CR}$ represent the new chroma data, i represents a serial number of the target line, K and J are constants of integer and respectively represent a lower limit and an upper limit of the neighboring lines, and $CB_k$ and $CR_k$ represent the acquired chroma data in the kth line and $\alpha_k$ represents a weight value ranging from zero to one for the kth line.

7. The method as claimed in claim 6 wherein the summation of $\alpha_k$ for deriving each of $\overline{CB}$ and $\overline{CR}$ equals one.

8. The method as claimed in claim 1 wherein the new chroma data are derived by following formulae:

$$\overline{CB} = \sum_{k=i-K}^{i+J} CB_k \times \alpha_k; \text{ and}$$

$$\overline{CR} = \sum_{k=i-K}^{i+J} CR_k \times \alpha_k,$$

$$\overline{CBr} = a \times \overline{CB} + b; \text{ and}$$

$$\overline{CRr} = a \times \overline{CR} + b,$$

where $\overline{CB}$ and $\overline{CR}$ represent the new chroma data, i represents a serial number of the target line, K and J are constants of integer and respectively represent a lower limit and an upper limit of the neighboring lines, and $CB_k$ and $CR_k$ represent the acquired chroma data in the kth line and $\alpha_k$ represents a weight value ranging from zero to one for the kth line, $\overline{CBr}$ and $\overline{CRr}$ represent the new chroma data, a represents a changing rate and b represents an offset.

9. The method as claimed in claim 8 wherein the summation of $\alpha_k$ for deriving each of $\overline{CB}$ and $\overline{CR}$ equals one.

10. A system of video data conversion comprising:
a single converter coupling to a plurality of receiving devices, acquiring chroma data of a target line of a video stream encoded in a first transmission format, acquiring chroma data of a certain number of neighboring lines near the target line, generating new chroma data by calculating from the acquired chroma data of the target line and the neighboring lines, replacing the acquired chroma data of the target line with the new chroma data, and transmitting the video stream with the new chroma data encoded in the first transmission format; and
said receiving devices, each of the receiving devices receives the video stream encoded in the first transmission format and drops partial chroma data to acquire a new video stream encoded in a second transmission format.

11. The system as claimed in claim 10 wherein the chroma data of the target line is acquired from a first portion of a video stream in a transmission format, the chroma data of neighboring lines is acquired from a second portion of the video stream, the new chroma data of the target line is encapsulated into the first portion of the video stream, and the new chroma data of the target line is transmitted via the modified video stream.

12. The system as claimed in claim 11 wherein the first portion and second portion are active portions of the video stream, and the transmission format is the CCIR 656.

13. The system as claimed in claim 10 wherein the first transmission format is 4:2:2 format and the second transmission format is 4:2:0 format.

14. The system as claimed in claim 13 wherein each of the receiving device drops half of the chroma data in the video stream transmitted from the converter to acquire a 4:2:0 format video stream.

15. The system as claimed in claim 10 wherein the new chroma data of the target line are derived by two formulae:

$$\overline{CB}=(CB_i-CB_{i-1})\times\alpha+CB_{i-1}; \text{ and}$$

$$\overline{CR}=(CR_i-CR_{i-1})\times\alpha+CR_{i-1},$$

where $\overline{CB}$ and $\overline{CR}$ represent the new chroma data of the target line, i represents a serial number of the target line, $CB_i$ and $CR_i$ represent the acquired chroma data of the target line, $CB_{i-1}$ and $CR_{i-1}$ represent the acquired chroma data of the neighboring line and $\alpha$ represents a weight value ranging from zero to one.

16. The system as claimed in claim 10 wherein the new chroma data are derived by following formulae:

$$\overline{CB}=(CB_i-CB_{i-1})\times\alpha+CB_{i-1};$$

$$\overline{CR}=(CR_i-CR_{i-1})\times\alpha+CR_{i-1};$$

$$\overline{CBr}=a\times\overline{CB}+b; \text{ and}$$

$$\overline{CRr}=a\times\overline{CR}+b,$$

where $\overline{CB}$ and $\overline{CR}$ represent average chroma data, i represents a serial number of the target line, $CB_i$ and $CR_i$ represent the acquired chroma data of the target line, $CB_{i-1}$ and $CR_{i-1}$ represent the acquired chroma data of the neighboring line and $\alpha$ represents a weight value ranging from zero to one, $\overline{CBr}$ and $\overline{CRr}$ represent the new chroma data, a represents a changing rate and b represents an offset.

17. The system as claimed in claim 10 wherein the new chroma data of the target line are derived by two formulae:

$$\overline{CB} = \sum_{k=i-K}^{i+J} CB_k x \alpha_k; \text{ and}$$

$$\overline{CR} = \sum_{k=i-K}^{i+J} CR_k x \alpha_k,$$

Where $\overline{CB}$ and $\overline{CR}$ represent the new chroma data, i represents a serial number of the target line, K and J are constants of integer and respectively represent a lower limit and an upper limit of the neighboring lines, and $CB_k$ and $CR_k$ represent the acquired chroma data in the kth line and $\alpha_k$ represents a weight value ranging from zero to one for the kth line.

18. The system as claimed in claim 17 wherein the summation of $\alpha_k$ for deriving each of $\overline{CB}$ and $\overline{CR}$ equals one.

19. The system as claimed in claim 10 wherein the new chroma data are derived by following formulae:

$$\overline{CB} = \sum_{k=i-K}^{i+J} CB_k x \alpha_k; \text{ and}$$

$$\overline{CR} = \sum_{k=i-K}^{i+J} CR_k x \alpha_k,$$

$$\overline{CBr} = a x \overline{CB} + b; \text{ and}$$

$$\overline{CRr} = a x \overline{CR} + b,$$

where $\overline{CB}$ and $\overline{CR}$ represent average chroma data, i represents a serial number of the target line, K and J are constants of integer and respectively represent a lower limit and an upper limit of the neighboring lines, and $CB_k$ and $CR_k$ represent the acquired chroma data in the kth line and $\alpha_k$ represents a weight value ranging from zero to one for the kth line, $\overline{CBr}$ and $\overline{CRr}$ represent the new chroma data, a represents a changing rate and b represents an offset.

20. The system as claimed in claim 19 wherein the summation of $\alpha_k$ for deriving each of $\overline{CB}$ and $\overline{CR}$ equals one.

* * * * *